Sept. 20, 1927.
E. J. CARROLL
1,643,197
CONTROL MEANS FOR ELECTRICALLY DRIVEN MACHINES
Original Filed Jan. 12, 1922    8 Sheets-Sheet 7
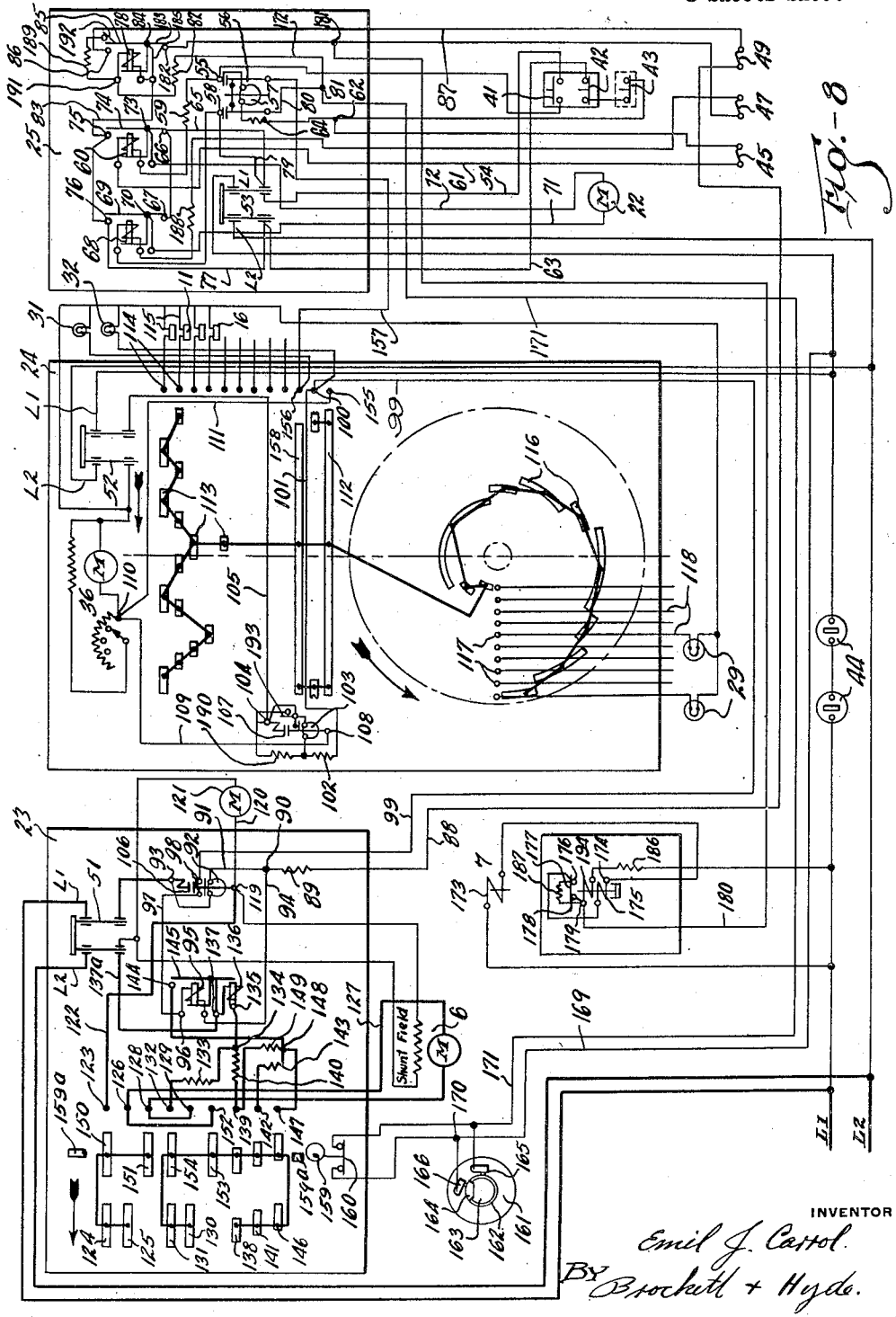
INVENTOR
Emil J. Carrol.
By Brockett + Hyde.
ATTORNEYS

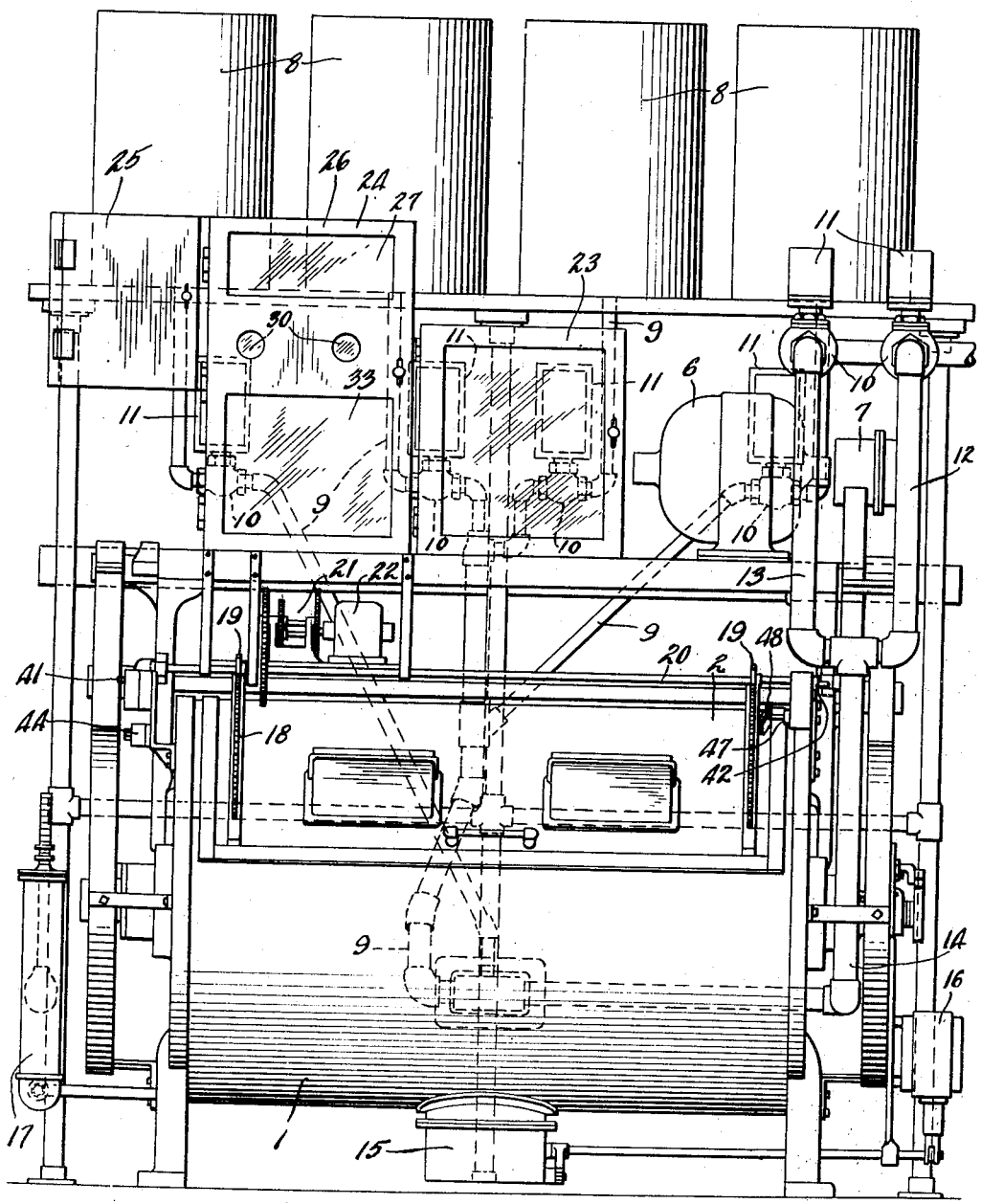

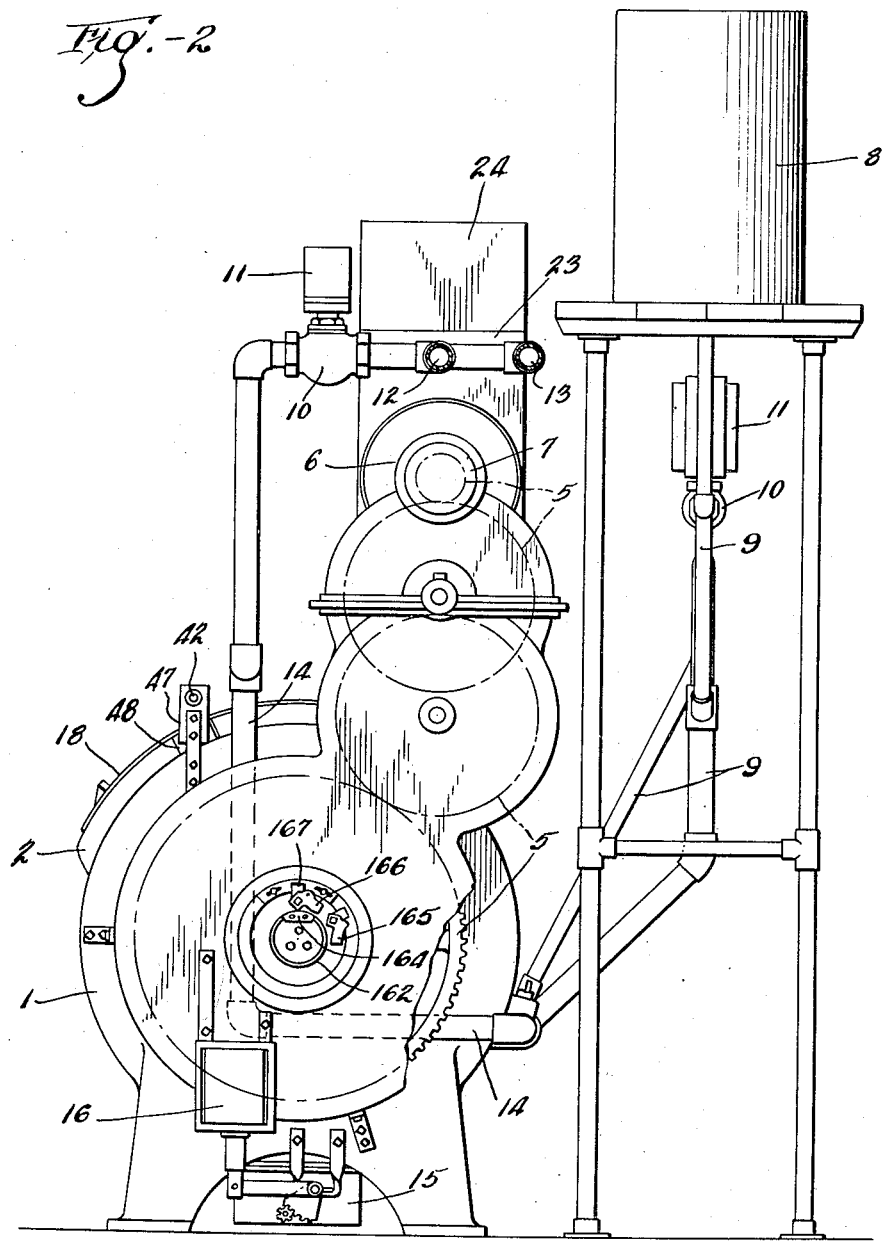

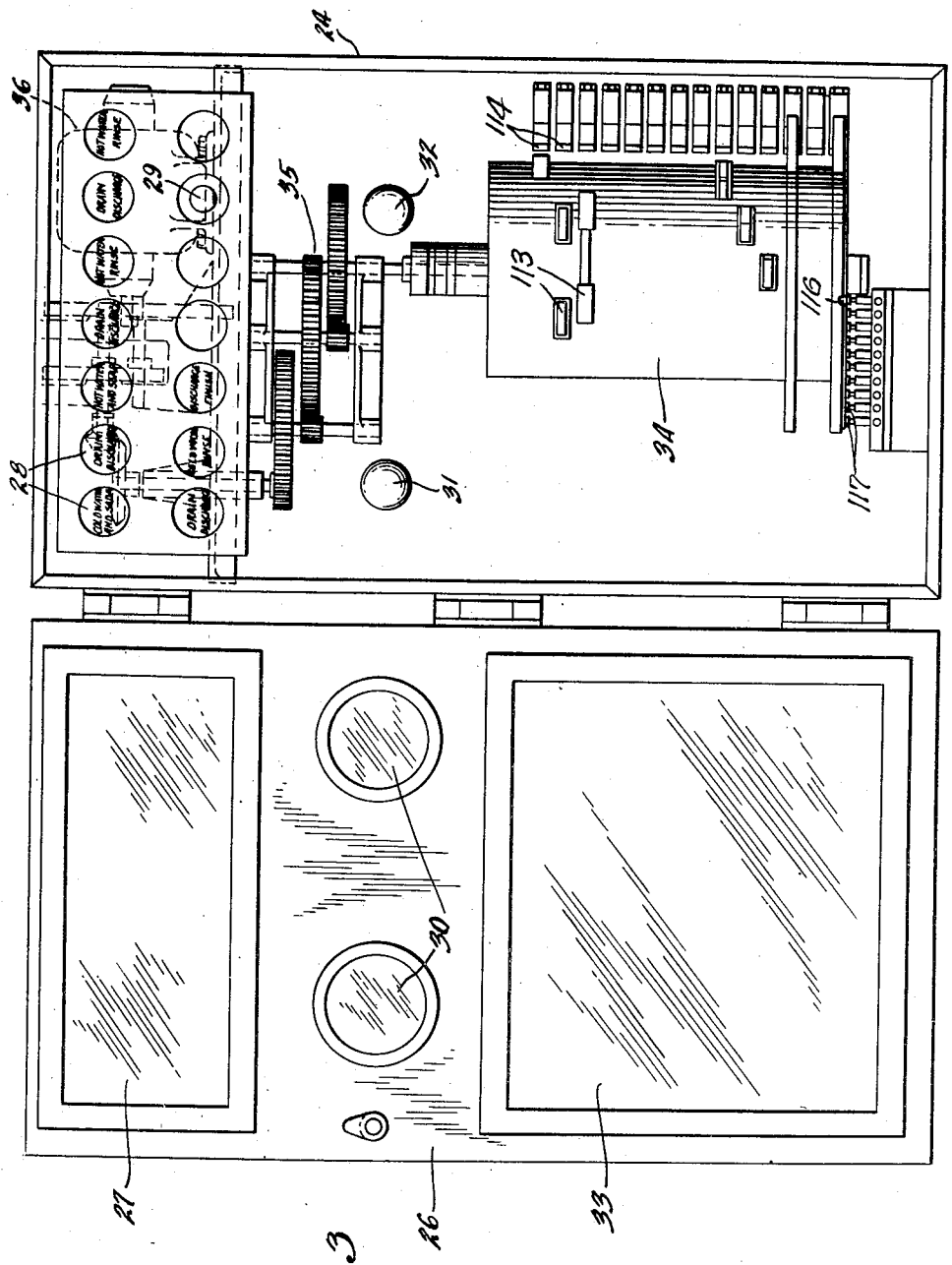

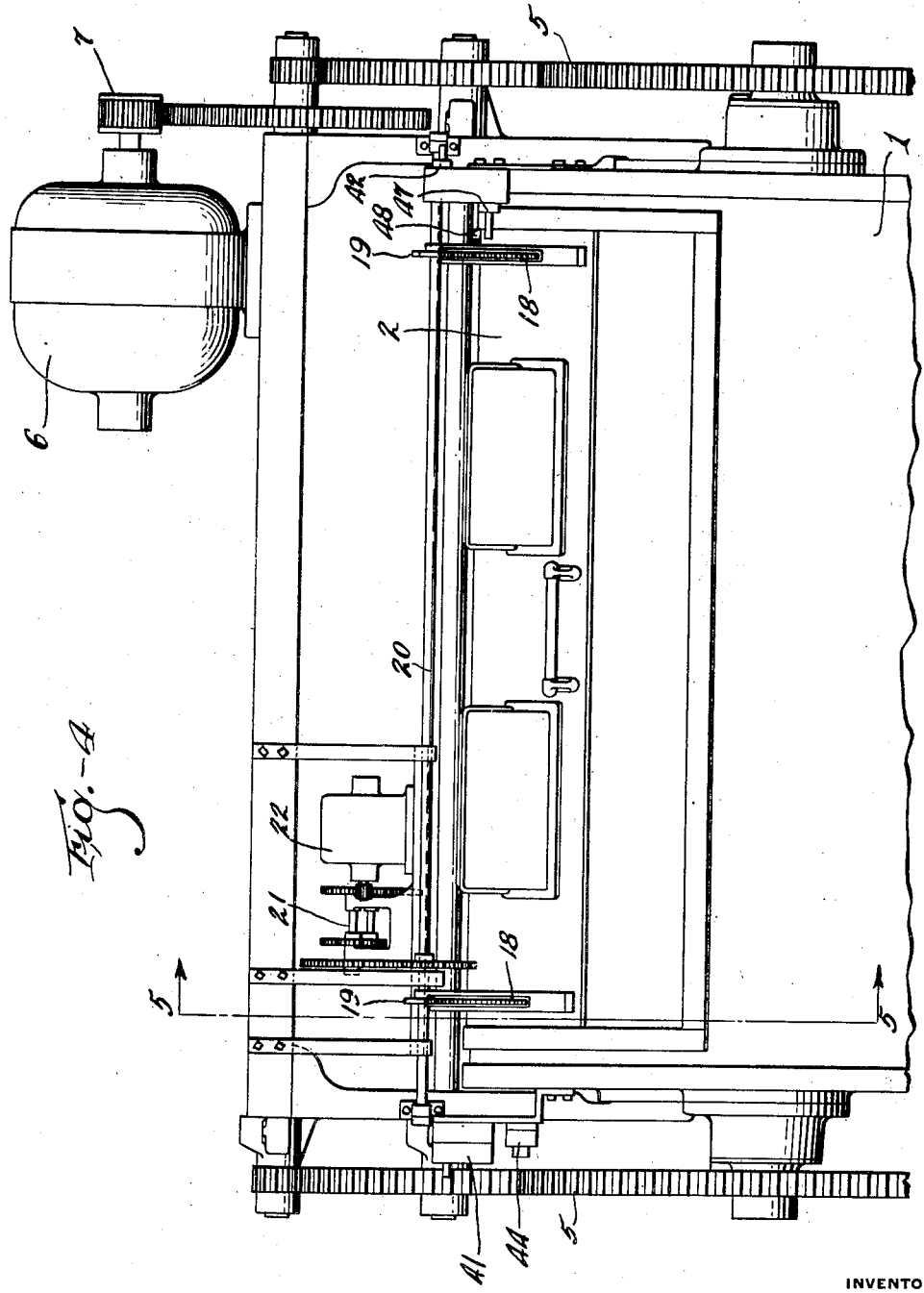

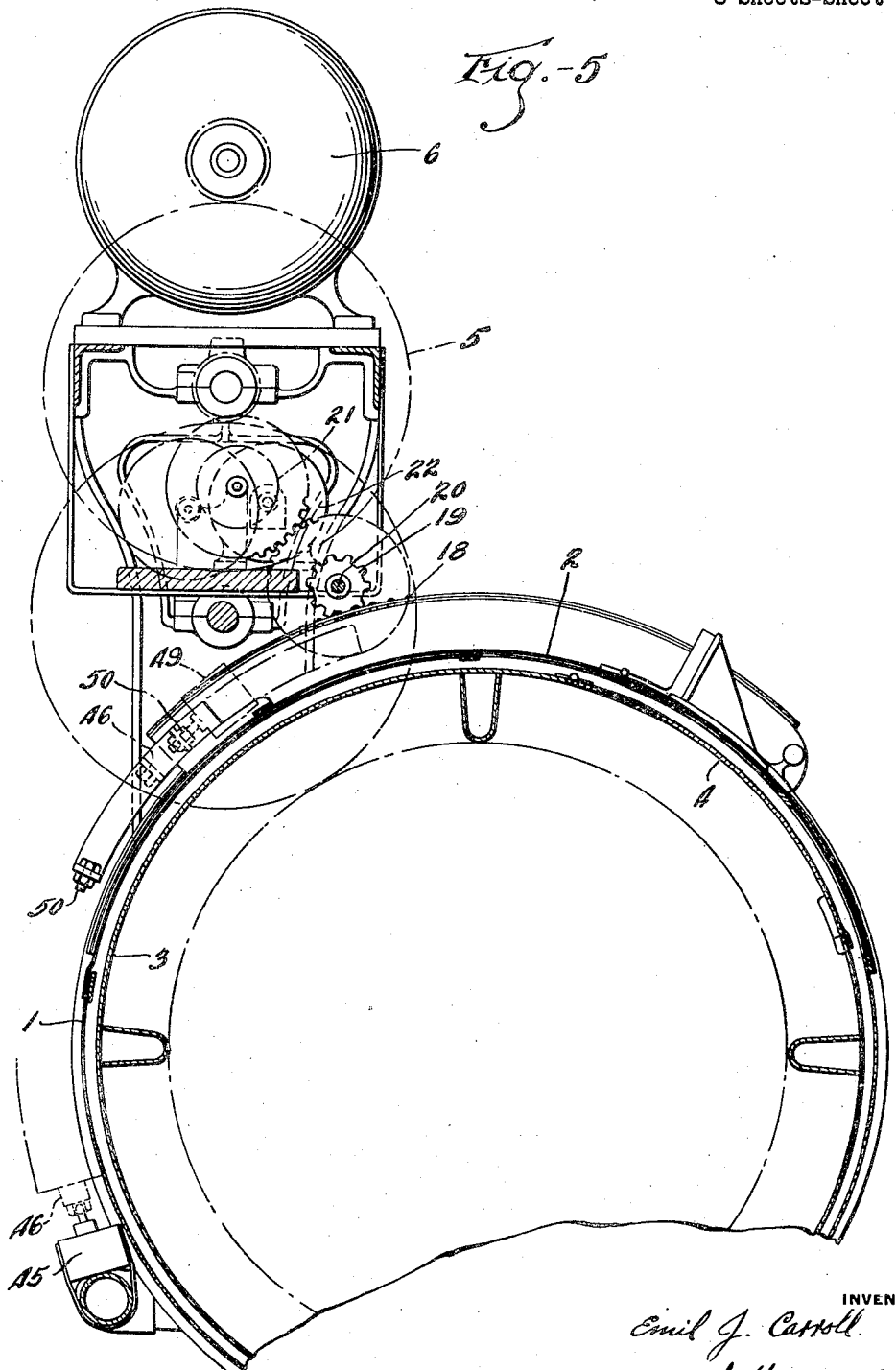

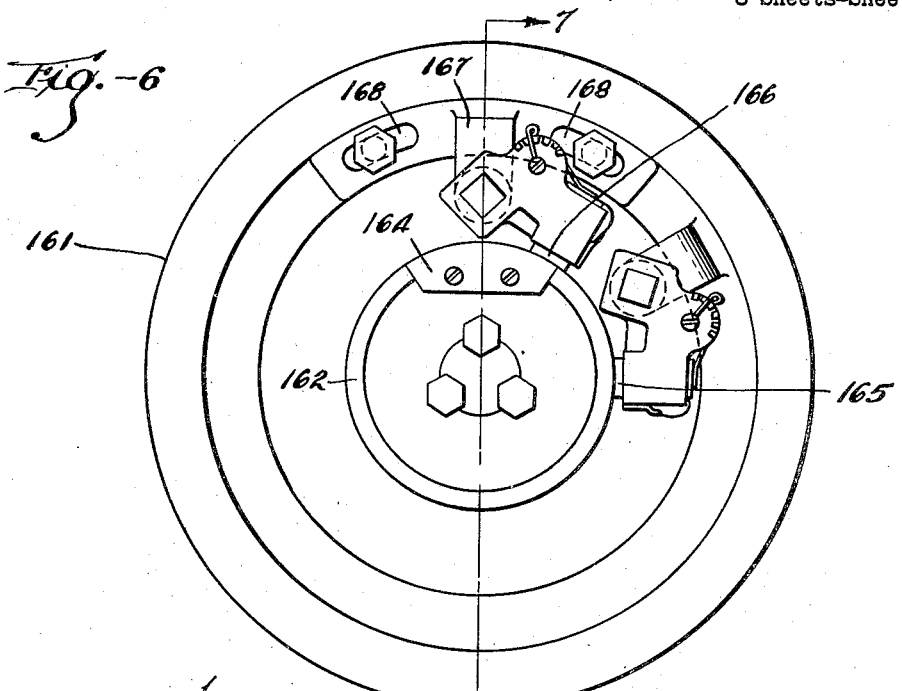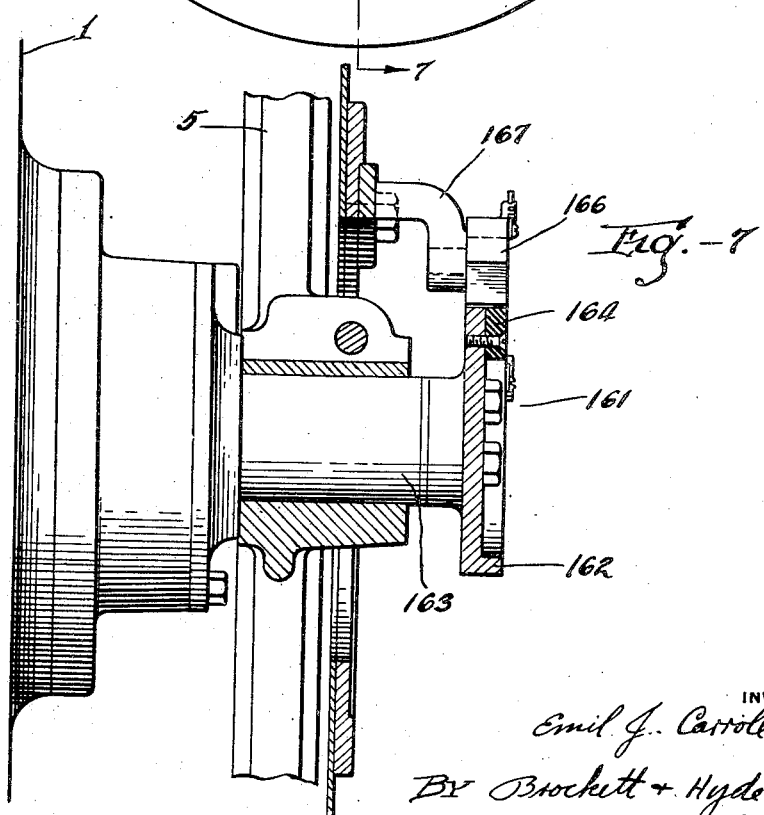

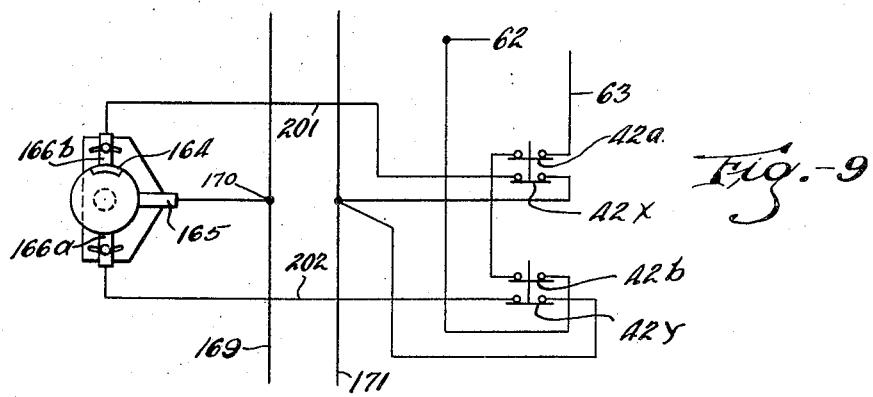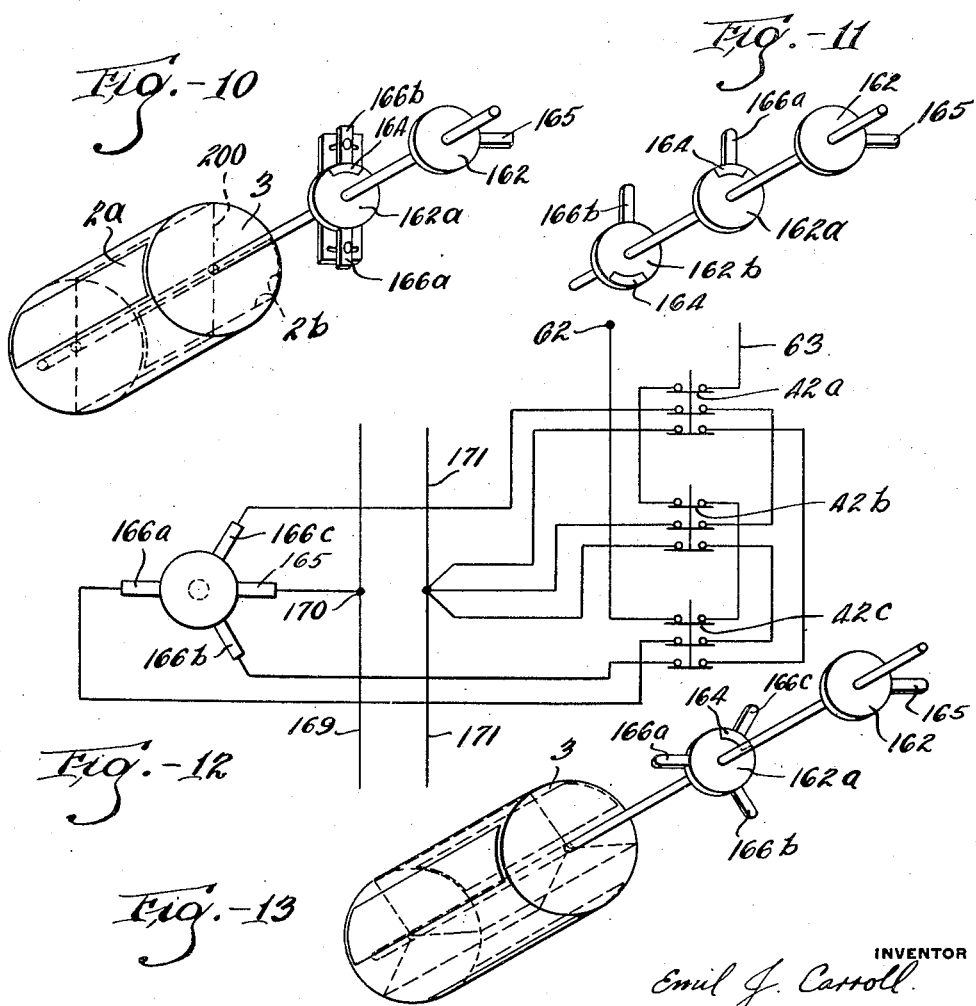

Patented Sept. 20, 1927.

1,643,197

UNITED STATES PATENT OFFICE.

EMIL J. CARROLL, OF NORWOOD, OHIO, ASSIGNOR TO THE AMERICAN LAUNDRY MACHINERY COMPANY, OF NORWOOD, OHIO, A CORPORATION OF OHIO.

CONTROL MEANS FOR ELECTRICALLY-DRIVEN MACHINES.

Original application filed January 12, 1922, Serial No. 528,696. Divided and this application filed April 26, 1926. Serial No. 104,728.

This invention relates to control means for electrically driven machines, and is a division of my copending application for automatic washing machine, Serial No. 528,696, filed January 12, 1922.

One object of the invention is to provide an improved automatic washing machine embodying a stationary outer casing having a door and an inner movable cylinder or receptacle containing the clothes to be washed and having a door, said machine being provided with means to register the doors of the outer casing and cylinder at the conclusion of the washing cycle and to automatically open the door of said casing.

A further object of the invention is to provide an improved automatic washing machine in which the registration of the casing and cylinder doors is controlled automatically even though the cylinder be of the oscillating type, so that proper registration is secured by taking into account the direction of rotation of the cylinder, its speed of rotation and the time.

A further object of the invention is to provide an automatic washing machine so arranged that closing of a door to the machine initiates the washing cycle, said cycle being thereupon carried out automatically to completion and including automatic opening of the controlling door.

A further object of the invention is to improve the control circuits and system to properly provide for stopping the machine under various conditions, such as the normal automatic stop, a manually controlled stop for inspection purposes, and an extra stop for use in case of emergency, and to also take care of multiple compartment washing machines, enabling the drum thereof to be stopped at any time with the door of any desired compartment registered with the casing door.

Further objects of the invention are in part obvious and in part will appear more in detail hereinafter.

The invention comprises the construction and arrangement of parts hereinafter described and claimed.

In the drawings, which represent one suitable embodiment of the invention, Fig. 1 is a front elevation; Fig. 2 is an end view from the right in Fig. 1, parts being broken out and in section to expose interior parts; Fig. 3 is a front elevation of the process controlling drum and automatic process indicating devices, the casing door being open for convenience of illustration; Fig. 4 is a front elevation, on a larger scale, showing the door operating mechanism; Fig. 5 is a sectional elevation on the line 5—5, Fig. 4; Fig. 6, is an end view, on a larger scale, showing a circuit controlling device; Fig. 7 is a sectional view thereof on approximately the line 7—7, Fig. 6; Fig. 8 is a diagrammatic view illustrating the electric controlling circuits and systems; and Figs. 9 to 13 inclusive, are diagrammatic views illustrating control systems for multiple compartment washers.

Referring to the drawings, the washing machine shown comprises a suitable frame including a stationary outer casing or tub 1 having a sliding door 2, and in which casing is journalled a rotatable cylinder 3 having a movable or hinged door 4 providing access to the cylinder for charging or unloading the same. The cylinder is driven by suitable gearing marked generally at 5, from a suitable power source, such as the reversible electric motor 6, which is provided with suitable control mechanism hereafter described more in detail, enabling said motor to be intermittently reversed and thereby provide for oscillating said cylinder or rotating it first in one direction and then in the other to produce efficient washing effects. The motor or the driving mechanism is also provided with a suitable electric brake, indicated generally at 7, the purpose of which is to quickly stop rotation of the cylinder and thereby assist in more exactly spotting or registering the cylinder and casing doors as will more fully appear. The details of this electric brake are immaterial and it may be, for example, of the form described in my prior application referred to.

Suitably located adjacent to the machine and preferably at a higher level are a series of tanks or receptacles 8 containing those ingredients which are used during the washing process, for example, soap, soda, bleach, sour and blueing. Communication between said receptacles and the casing is established through a series of pipes 9 in each of which is a valve 10 controlled by a solenoid or electro-magnet 11. 12 and 13 indicate the hot and cold water supply pipes also provided with valves 10 controlled by solenoids or electro-magnets 11 and communicating with the casing through a pipe 14. 15 is the drain valve controlled by a solenoid or electro-magnet 16, while 17 is the automatic float operated liquid level controlling device.

All the parts so far described are or may be of the same construction and arrangement as those illustrated in my prior application referred to.

Referring now to Figs. 4 and 5, the present machine is provided with suitable mechanism for automatically operating the door of the outer tub or casing. Said door in shape is the segment of a cylinder and is mounted to slide in suitable end guide ways. On its cylindrical surface it is provided with suitable rack teeth 18, one set at each end, which engage with pinions 19 on a shaft 20 actuated through suitable reducing gearing, represented generally at 21, by a reversible electric motor 22.

The apparatus is also provided with suitable automatic controlling and indicating devices, including switches, rotating controller drums, relays, contacts, etc., many of which will be described and their location set forth as the description of the operation proceeds. Many of these controlling devices may be mounted upon a suitable panel or panels supported upon or near the machine, or at distant points if desired. In the drawings, the machine shown is provided with three panels, to wit, panel 23, which is the washer reverse drum panel and carries the controller and devices for producing rotation in opposite directions of the washing machine cylinder; the panel 24, which may be called the process drum panel and contains the controlling drum and other devices for producing proper flow of washing materials to and from the washing machine, for controlling the time of treatment with such materials, and for indicating the progress and stage of the cycle of washing operations; and a panel 25, which may be called the relay panel, and which carries the controlling relays.

Referring first to the process drum panel 24, said panel is indicated in detail in Fig. 3. It comprises a suitable casing having a door 26 provided with an upper window 27 of clear glass, behind which may be placed a series of transparent or translucent indicating cards bearing legends, as at 28, indicating different stages of the washing process or cycle and behind each of which legends is an electric lamp 29. The door also is provided with two smaller windows 30, one of clear glass and the other of colored glass, such as red, behind which are mounted a running lamp 31 and an idle or stop lamp 32. A lower window 33 exposes to view the rotating process controller drum 34 driven through suitable reducing gearing, marked generally 35, by a motor 36 and provided with a series of conducting segments 113 etc. co-operating with contacts 114 etc. in circuits including the several solenoids 11, 16, etc. This controller and the co-operation of its segments with circuits controlling the solenoids for actuating the valves are the same as those in my prior application referred to, excepting that said controller may also be provided with a suitable additional set of segments, shown conventionally as spaced at different distances radially from its shaft or axis, one of which is marked 116, and which segments co-operate with contacts 117 in shunt circuits 118 through the various indicating lamps 29 before referred to. The segments and contacts at the bottom of the controller for these indicating circuits are properly arranged with reference to the segments and contacts 113, 114 so that as each step in a washing cycle is initiated and proceeds the corresponding lamp in the indicating portion of panel 24 is illuminated and a legend 28 is thereby rendered visible or legible to at all times indicate to an observer what particular step of the washing operation is proceeding. The circuits for these indicating lamps, of course, need not be separate circuits, as shown, but might be coupled in parallel or otherwise to the respective circuits through the several solenoids 11, 16 so as to operate conjointly therewith, or any other suitable indicating means or control mechanism therefor might obviously be used for the purpose.

Referring now to the wiring diagram, Fig. 8, the invention will more readily be understood if some reference is first made to some of the features there shown.

41 is the start button which may be a simple normally open switch suitably located at any convenient point on the machine. 42, 43 are normally closed inspection stop buttons located at suitable points. 44 are normally closed emergency stop buttons.

45 is a limit switch of suitable form, preferably mounted on the back of the tub or casing so that its button is engaged and the switch is closed by an abutment 46 on the tub door when said door is fully opened, said abutment moving away from the switch as the door closes and allowing said limit switch to open.

47 is another limit switch suitably mounted on the tub or casing to be engaged by an abutment 48 on the door so that said switch is closed when the door is closed and is opened as the door reaches open position. 49 is another limit switch also suitably located on the tub or casing to be actuated by an abutment 50 on the door, said switch being open when the door is open and being closed as the door reaches closed position.

$L^1$, $L^2$ represent the lead lines from the source of power, the current from said lead lines being conducted to various subsidiary switches 51, 52 and 53 in the several panels, as is usual, although in the description hereinafter, no special reference will be made to said subsidiary switches, but the circuits will be traced from $L^1$ to $L^2$ or vice versa, as the case may be.

The operation is as follows:

Speaking generally, and assuming that the various subsidiary switches 51, 52 and 53 are closed, pressure on start button 41 starts the door operating motor 22, causing door 2 to close. The closing of said door actuates other switches to initiate operation of the process drum on panel 24 by operation of its motor 36, and still other switches to initiate and carry on operation of the washer reverse drum controller on panel 23. The cycle of washing operations proceeds automatically with actuation at intervals of the necessary solenoids to control the flow of washing materials to and from the drum and to also control the periods of the several steps of the washing method, while at the same time the indicating mechanism indicates the stage of the process being performed, all the foregoing being controlled by the process drum. At any time the process may be stopped and the door may be opened for inspection purposes by actuating one of the inspection stops 42, 43, while a quick and immediate stop can be secured in case of emergency by operating the emergency stop button 44. Under normal operation the cycle proceeds automatically until in the natural course of events a normal stop is automatically effected, when the series of starting operations is reversed to produce the normal stop which concludes with the automatic opening of the door.

Taking up the circuits now in detail, let us assume that the machine has been loaded with a charge of material to be washed; that the several supply tanks or receptacles 8 are filled; that the hot and cold water supplies are turned on, and that the door 4 to the washing machine cylinder is closed. In this position the casing door 2 is open, switch 45 is closed, switch 47 is open and switch 49 is open. Closing the start button 41 produces a circuit as follows:

From $L^1$, by wire 54, start button 41 to point 55, which is the right hand contact of a relay, marked generally 56, having a coil 57 and a second contact 58, contacts 55, 58 being normally open, thence through a resistance 59, through the coil of a closing relay 60, wire 61, switch 45 to terminal 62, thence through inspection stops 43, 42 and then by way of wire 63 to $L^2$. The effect of the circuit is to energize closing relay 60.

Energy is also supplied to the coil 57 of relay 56, flowing to and through said coil from point 55 and thence through a resistance 64 to the terminal 62 and thence through the inspection stop buttons 43, 42 as before. A maintaining circuit for this coil 57 will hereafter be referred to.

Energy is now supplied to the door operating motor 22 as follows: from $L^1$ by way of wire 65 to contact 66 of relay 60, then to contact 67 of the opening relay 68, through an arm of the armature 69 thereof to the point 70, thence by way of wire 71 through the door operating motor 22, wire 72 to contact 73 of the closing relay 60, thence through an arm of the armature 74 thereof to the contact 75, to contact 76, and by way of wire 77 to $L^2$.

The current flowing through motor 22 causes the door 2 to automatically close. As it moves away from open position switch 47 closes and as it reaches closed position, switch 45 is opened and switch 49 is closed.

The initial closing of relay 56 when the start button is pressed also energizes the coil of a brake relay 78, closing said relay in running position. This circuit is as follows:

From $L^1$ by wire 79, contact 58, wire 80 to terminal 81, protecting resistance 82, coil of relay 78, wire 83 to point 75, point 76, and thence by wire 77 to $L^2$.

The closing of limit switch 47 as the casing door starts closing completes a circuit to the coil of the opening relay 68, which circuit will be hereafter referred to.

As the door reaches its closed position, switch 45 opens, thereby de-energizing the closing relay 60 and at the same time closes switch 49, the closing of which switch initiates operation of the reversing and process drums by the production of a circuit as follows: from $L^2$ by wire 77 to point 75 to point 84 of the brake relay 78, through the armature 85 of said relay to the point 86, wire 87, switch 49, wire 88 to the washer reverse drum panel 23, protective resistance 89 to point 90, from which two circuits extend as follows:

(a). From point 90 through wire 91 and coil 92 of a contactor to point 93 and thence to $L^1$. (b). From point 90 through wire 94, coil 95 to 96, wire 97, contacts 98 (now closed) wire 99 to terminal 100, then by way of wire 101. resistance 102, coil 103 to the point 104 and by wire 105 to $L^1$. The first circuit $a$ closes the main switch 106 of the washer reverse drum controlling circuit and also closes contacts 98. The second circuit $b$ energizes coil 103 on the process drum panel 24 and establishes the first running circuit on said panel, to wit, from $L^1$ on panel 24 to the point 104, thence through the contacts 107 to point 108, wire 109 to point 110 and thence in shunt through the armature and field of pilot motor 36 to $L^2$. The segments on the process controlling drum are all of $L^1$ polarity, the circuit therefor being from $L^1$ by wire 105 to point 104, point 108, wire 109 to point 110, wire 111, contact 155, to the running segment 112, all of the segments on the drum being electrically connected, as indicated.

Energization of the pilot motor 36 produces rotation of the process drum, each of its segments, marked generally 113, coming in turn and in proper order into engagement with one of the several contacts 114 connected in shunt circuits 115 to the various solenoids or electro-magnets 11, 16, etc., which control the flow of washing materials to and from the washing machine. The second series of segments on the bottom of the drum, indicated generally at 116 and electrically connected to segments 113, likewise come in turn into engagement with contacts 117 in shunt circuits 118 through the various indicating lamps 29, so that said lamps are illuminated in turn and in proper order to at all times indicate the progress and stage of the washing operation.

Energization of the washer reverse drum main contactor coil 92 produces a pilot motor circuit as follows: from $L^1$ on the washer reverse drum panel 23 to the point 93, thence through the main contacts 106 to the point 119, wire 120, pilot motor 121 to $L^2$. Said pilot motor 121 turns the controlling drum on the washer reverse drum panel and varies the circuits through the washer cylinder operating motor 6 to produce rotation of said cylinder first in one direction and then in the other direction by circuits as follows: from $L^1$ to point 93, contacts 106, point 119, wire 122 to point 123, segment 124, segment 125, contact 126, wire 127, through the armature of motor 6, contact 128, contact 129, segment 130, segment 131, contact 132, starting resistance 133, point 134 to point 135, series lock out coil 136, to point 137, wire $137^a$, to $L^2$.

The next step is to cut out starting resistance, the path being the same as before up to the segment 131, from which the circuit continues through the segment connections to segment 138, thence to contact 139 through resistance 140 to the point 134 and thence as before.

The next resistance is cut out in the same fashion, the circuit being as before up to segment 141 to contact 142 and thence through resistance 143 to the point 144, the current by-passing the lock out coil 136 of the relay, the contact finger 145 of which is closed. Continuing, the circuit extends, from the point 144 through contact finger 145 to the point 137, wire $137^a$, to $L^2$. The resistance is cut out in this manner by steps until finally the motor is thrown across the line by a circuit running to segment 146 from which the current flows to contact 147 to point 148, point 144, point 137 to $L^2$.

It will be noticed that resistance 149 is not used in an ordinary run, it being for the purpose of acting as protective resistance in the event that the lock out relay does not lock out correctly. The path would then be from contact 139 through protecting resistance 149 to point 148, point 144, point 137 to $L^2$, the protecting resistance 149 being of the same value as resistance 140.

It is now only necessary to reverse the motor by segments on the other half of the controlling drum as the resistance acceleration is a duplicate in the two directions. When the drum is operating upon the reverse set of segments the path is as follows: from $L^1$ to point 93, point 119, contact 123, segment 150, segment 151, contact 128 through the armature of the motor, contact 126, contact 152, segment 153, segment 154, contact 132, resistance 133, point 135, lock out coil 136, point 137 to $L^2$. The direction of current through the armature is the reverse of that before described. The shunt field of the motor is in a circuit from $L^1$ to the point 119, through the shunt field to $L^2$ under both conditions of rotation. As stated, the further rotation of the washer reverse drum again cuts out resistance and finally throws the motor across the line. As the drum revolves the motor therefore revolves first in one direction and then in the other, with like motion of the washing machine cylinder, as is the custom in machines of this kind.

The maintaining circuit for the relay 56 (hereafter referred to as circuit $c$) should here be described and is as follows: from $L^1$ on the process drum panel 24 by wire 105 to the point 104, point 108, wire 109, point 110, contact 155, running segment 112, segment 158, contact 156, wire 157, point 55, coil 56, resistance 64, point 62 and thence through the inspection stop buttons by wire 63 to $L^2$.

*Stop circuits.*

The stopping cycle might be said to be the reverse of the starting cycle, with the exception that there are three conditions under which the machine can or will stop, to wit, an emergency stop, inspection stops, and normal stop.

The emergency stop is acccomplished by opening switch 44 which is of $L^1$ polarity. Opening this switch immediately halts all operations. Of course, a plurality of emergency stop buttons in series, two thereof being shown, could be located at different points wherever convenient or desirable and the actuation of any one of them produces the aforesaid results. After the emergency stop switch is opened, closing of said switch accomplishes nothing unless the door to the washer happens to be in position ready to open, whereupon said door will immediately open. In any event, the starting button must always be pressed to again start the washer following an emergency stop. Several inspection stop switches of which two, marked 42, 43, are shown, can also be located at convenient positions. These inspection stop buttons are in the same maintaining circuit $c$ for the relay 56 which includes the contact 156 which cooperates with segment 158. Inspection stop buttons 42, 43, etc., are on one side and segment 158 and contact 156 on the other side of the coil of contactor 56. Therefore, either the opening of an inspection switch 42, 43 or the running of segment 158 off from the contact 156 at the conclusion of a cycle and the completion of a full rotation of the process controlling drum accomplishes the same effects. In either case opening of this maintaining circuit $c$ allows the washer to continue to run for a few moments until the washing cylinder is rotating in the proper direction and at the proper speed and has reached the proper position. When all conditions are exactly correct the brake is automatically applied, the washing cylinder is stopped with its door spotted or registered with the casing door, and the casing door automatically opens. These effects are produced regardless of whether a normal stop is produced by the process drum or by opening an inspection switch, so that one description will suffice for both conditions. When a normal stop is obtained by operation of the process drum the complete washing operation has been concluded and the machine is ready to be emptied and reloaded and the cycle again initiated by closing the start button, as before. When the stop is due to operation of an inspection switch the process drum is halted and although the casing door is also opened, pressure of the start button will not begin a new cycle but will cause the mechanism to continue the process at the point where it left off and carry through the remainder of the operation to the conclusion of the cycle.

At this point it may be well to state that as described in my prior application before referred to, the several segments upon the process drum for controlling both the segments 113 for the solenoids and also the segments 116 for the indicating lamps are, of course, made readily adjustable both as to circumferential position and as to length so that the apparatus may be made to perform any desired washing process involving the automatic delivery to the washing machine of any number of different washing materials, such as those before referred to, and the draining of the machine between steps of the process and at its conclusion, as is usual.

Let us assume now that the maintaining circuit $c$ has been opened either at the segment 158 and contact 156 or by opening an inspection stop. Opening said circuit determines the time element in stopping the machine and opening its door. The time of stop is therefore determined either by the will of the operator who actuates the inspection stop or automatically by the effect of the process drum at contact 156.

The stopping of the machine is also controlled by both the speed and direction of rotation of the washing machine cylinder. For this purpose and to secure accurate effects of this element of the control system the washer reverse drum on panel 23 has its rotating shaft 159$^a$ provided at one end, such as its lower end, with a cam 159 which actuates a normally closed switch 160 to be hereinafter referred to. This cam is set upon the drum shaft in timed relation with the segments of said drum which control the direction and speed of rotation of the washing machine cylinder, preferably being so set that the switch 160 is opened when the washing cylinder is revolving in one definite or predetermined direction and at a relatively low speed so that it is easily braked to a fixed quick stop. This is for the reason that the position of the washing cylinder at which the stopping operation begins may be so chosen or predetermined that the drift or coast of the cylinder during the stopping operation will be just sufficient to carry its door into registering relation with the casing door. Cam 159 is therefore set so that the stopping operation is initiated just before or just after a change in direction of rotation of the washing cylinder and at low speed thereof. The drawings show the cam 159 conventionally and any suitable construction can be employed for this purpose.

Stopping of the machine is also controlled by the position of the washing cylinder for the purpose of securing a braking action which compensates for and has due regard for any and all cylinder drift. This element of the control system insures accurate spotting or registration of the door of the washing cylinder with the casing door. For this purpose the washing machine is provided with suitable means adapted once during each revolution of the washing cylinder to open a normally closed switch 161. Any suitable means may be employed for this purpose. For example said switch may be in a circuit including an interrupted contacting ring or rings and cooperating contacts at one end of the washing cylinder shaft, a dead segment in said ring or rings interrupting the circuits once at each revolution. The drawings show for the purpose such an arrangement including a conducting ring 162 insulated from the washing cylinder shaft 163 and provided with a dead segment 164 half the width of said ring when viewed in elevation as shown in Fig. 7. Two brushes 165, 166 travel on said ring, one on the continuous conducting portion thereof and the other over the portion including the dead segment 164. This latter brush is circumferentially adjustable such as by being supported by a member 167 having slots 168, Fig. 6, to enable it to be timed with reference to the position of the door of the casing. The brushes are, of course, insulated from the main frame and in a circuit to be described.

When the maintaining circuit $c$ is opened as before described the washing machine will continue to run until the speed of the cylinder, its direction of rotation and its position are correct, as determined by simultaneous opening of switches 160, 161, whereupon the brake relay is opened by de-energization of coil 78, the brake is applied, and the drift of the cylinder, with the braking action, results in bringing the cylinder to rest with the cylinder and casing doors in proper registering relation.

The circuit through the brake relay is as follows: from $L^1$ by wire 169 to the point 170, thence in shunt through the two switches 160, 161, to wire 171, thence to the point 81, wire 172, through coil 78 and thence by wire 83 etc., to $L^2$. When the coil 78 is de-energized the braking circuit is as follows: from $L^1$ through the shunt brake 173 to point 174 through coil 175 to point 176 through contactor 177 to point 178, point 179, wire 180 to point 181, to point 182 on the brake relay through the arm 183 thereof to point 84, and thence by wires 185 and 83 to $L^2$. The purpose of resistances 186 and 187 is protective. They are inserted by the time relay, the solenoids of which are shown, so that full voltage is not left on the brake during the time the machine is stopped it being obvious that some braking power should be maintained on the machine while it is at rest.

Energization of brake coil 173 actuates the brake indicated conventionally at 7, Fig. 2, and quickly stops the driving motor 6, the gear connected therewith and the washing machine cylinder. The final condition is the automatic opening of the casing door, the circuit for which is as follows: from $L^1$ on panel 25 to the point 58 through the coil 68 of the opening relay through protective resistance 188, limit switch 47, point 181, point 182, point 84, wire 185 and thence, as before, to $L^2$. Energization of the opening relay coil 68, completes a circuit through the door operating motor as follows: from $L^1$ on panel 25 to point 66, to point 73, wire 72, door operating motor 22, wire 71, point 70, point 76 and wire 77 to $L^2$.

The door is therefore automatically opened which in turn closes limit switch 45 and opens limit switches 47 and 49, leaving the washer with its doors spotted or registered and ready to be unloaded and loaded for another operation. Pressing the start button initiates a new cycle as before.

It remains to describe the functions and effects of the resistance 189 on the relay panel, the resistance 190 on the process drum panel, and resistances 186 and 187 in the shunt brake circuit.

Resistance 189 is a shunt protective resistance for the coil 78. The current coming from coil 82 has the choice of two paths from the point 191, the first being through the coil 78 to wire 83 and the second being through the resistance 189 and a tail 192 on the contact finger 85, thence to point 84 and wire 83. This resistance cuts down the holding current for the coil.

Resistance 190 is likewise a protective resistance in shunt across the coil 103, being thrown into the circuit by the closing of the contactor 193 when the coil is energized. This coil 190 supplements the protecting resistance 102 which is initially thrown into the circuit through the coil 103.

Resistances 186 and 187 are likewise protecting resistances for the coils 194 and 175 respectively. In connection with this brake protecting relay it will be noted that the initial braking circuit is through the short circuiting finger 177 by-passing the resistance 187 and applying full current to the brake. The effect of coil 175 is to lift the plunger of the relay and also lift the finger 177, thereby inserting resistance 187 and limiting the current on the brake. At the same time another circuit is introduced for the protection of the relay coils, to wit, from $L^1$ through coil 186, coil 194 to point 179 and thence through wire 180 to the point 181, etc.

Figs. 9, 10 and 11 show the invention applied for use in connection with a washing machine the rotating cylinder of which is provided with two compartments separated by a diametrical partition, an arrangement involving two diametrically opposite doors. For example, in Fig. 10 the washing machine cylinder diagrammatically represented at 3 has a diametrical partition 200 forming two semi-cylindrical compartments provided with diametrically opposite sliding doors $2^a$, $2^b$. This form of machine necessitates an arrangement of controlling circuits and mechanism enabling the machine to be selectively stopped with either of its cylinder doors registering with the casing door so that each compartment in turn may be unloaded and refilled. The circuits and control mechanism for these doors may be like those heretofore described with such exceptions or modifications as are hereafter described and illustrated in Figs. 9, 10 and 11. Instead of two brushes 165, 166 co-operating with current conducting rings rotating with the cylinder, three brushes are used, marked respectively 165, 166ª and 166ᵇ. Brush 165 cooperates with a circumferentially continuous current conducting ring 162, while brushes 166ª, 166ᵇ both cooperate with a ring portion 162ª in current conducting relation with ring 162 and provided with a dead segment 164. The two brushes 166ª, 166ᵇ are spaced 180° apart and by circumferential adjustment of either said brushes or of the ring portion 162ª relative to the cylinder 3, the parts are timed to secure proper registering relation between the cylinder and casing doors as before stated.

In this arrangement there are two inspection stop buttons marked 42ª, 42ᵇ. Each of said buttons has an extension, that of button 42ª carrying a switch member 42ˣ in a circuit 201 from brush 166ᵇ to the wire 171, while the extension on button 42ᵇ actuates the switch 42ʸ in a circuit 202 from the brush 166ª to the wire 171. (Compare with Fig. 8.) Wires 169, 171 and 63 and points 62 and 170 are the same as shown in Fig. 8.

With this arrangement actuation of either one of the inspection stop buttons opens one of the circuits 201 or 202, so that said opened circuit is ineffective and the brush 166ᵇ or 166ª therein becomes ineffective, but the other of the two brushes with its corresponding circuit 202 or 201 becomes effective. In other words, if inspection stop button 42ª is pressed and held open brush 166ª is left effective and cooperates with the other parts of the control mechanism, just as did the brush 166, Fig. 8, until the cylinder stops with its door 2ª in proper registering relations with the casing door, whereas, if stop button 42ᵇ is pressed the brush 166ᵇ becomes effective and the cylinder stops with its door 2ᵇ in proper registering relations with the casing door.

If desired, two separate ring portions 162ª, 162ᵇ each having a dead segment 164 can be provided, as shown in Fig. 11. Each one of these rings with its dead segment cooperates with one of the brushes 166ª, 166ᵇ in the manner before described. Each of the two arrangements shown in Figs. 10 and 11 has some advantages on the question of circumferential adjustment of brushes or dead segment, as the case may be, for timing purposes.

From the foregoing it will be clearly understood that by further modification of the controlling circuits provisions may be included for controlling a cylinder with any number of circumferentially spaced doors, even as many as ten or more. For example, Figs. 12 and 13 correspond to Figs. 9 and 10 but show another arrangement for a cylinder having three compartments and three doors spaced circumferentially 120° apart. This arrangement requires three brushes 166ª, 166ᵇ and 166ᶜ spaced 120° apart and all cooperating with the ring member 162ª having a dead segment 164. Either the brushes together or the ring member 162ª are circumferentially adjustable for timing purposes. In this case the circuits are provided with three separate inspection stop buttons 42ª, 42ᵇ and 42ᶜ, each having a tail or extension provided with two switches. The circuit from each one of said brushes 166ª, 166ᵇ and 166ᶜ to the wire 171 includes the tail switches on two of the inspection stop buttons, the arrangement being such that when any inspection stop button is pressed the circuits to two of the brushes are opened, leaving one of said brushes effective so that said brush, when it cooperates with the dead segment 164 completes the chain of stopping factors and accomplishes stopping of the cylinder with the proper door in registration with the casing door.

The functions and advantages of the apparatus are obvious. The washing machine is practically entirely automatic requiring only an operation of the start button to initiate and cause the completion of a full cycle of washing operations excepting only in the case of an inspection or emergency stop, as before stated. As a consequence, the machine can be readily controlled from a central station at which the start button is located and timed in its relation to the operation of other machines. For this reason, the visible signalling device is of value, in addition to which each of the signalling lamps can be supplemented or replaced by audible or other signals located at the machine or at a distant central station, or visible signals can be placed in cooperating electrical relation both at the machine and at other points.

What I claim is:

1. In a controller for a motor driven device adapted to automatically effect periodic speed variation therein, means to direct stopping of the device in any one of a plurality of predetermined positions, and means to render the former means ineffective for stopping the device pending insured attainment of a predetermined speed.

2. In a controller for a motor driven device adapted to automatically effect periodic reversals of rotation thereof, means to direct stopping of the device in one of a plurality of predetermined positions, and means dependent upon direction of rotation to effect stopping of the device.

3. In a controller for a motor driven device, means to direct stopping of the device, and means for rendering the former means ineffective for stopping pending attainment of one direction of rotation and movement of the device to any one of a plurality of predetermined angular positions.

4. In a controller for a motor driven device adapted to effect periodic reversals of rotation thereof, means to direct stopping of the motor, and means subject to coincident predetermined conditions of direction of rotation and low speed of the device to effect stopping of the motor.

5. In a controller for a motor driven device adapted to effect periodic variations of speed therein, means to direct stopping of the motor, and means subject to coincident predetermined conditions of angular position and low speed of the device to effect stopping of the motor.

6. In a controller for a motor driven device adapted to effect periodic reversals of rotation thereof, means to direct stopping of the motor, and means subject to coincident predetermined conditions of low speed, angular position and only one direction of rotation of the device to effect stopping of the motor.

7. In a controller for a motor driven device adapted to effect periodic reversals of rotation thereof, means to direct stopping of the device, and means subject to coincident predetermined conditions of direction of rotation and low speed, to effect stopping of the device in any one of a plurality of predetermined angular positions.

8. In a controller for a motor driven device adapted to effect periodic variations of speed therein, means to direct stopping of the device, and means subject to coincident predetermined conditions of angular position and low speed, to effect stopping of the device in any one of a plurality of predetermined angular positions.

9. In a controller for a motor driven device adapted to effect periodic reversals of rotation thereof, means to direct stopping of the device, and means subject to coincident predetermined conditions of low speed, angular position and only one direction of rotation, to effect stopping of the device in any one of a plurality of predetermined angular positions.

10. In a controller for a motor driven device adapted to effect periodic reversals of rotation thereof, means operatable during variations in speed and direction of rotation of the device to direct stopping of the device in a preselected position, and means subject to coincident predetermined conditions of low speed and direction of rotation, to effect stopping of the device in the position selected.

11. In a controller for a motor driven device adapted to effect periodic variations of speed therein, means operatable during variations in speed of the device to direct stopping of the device in a preselected position, and means subject to coincident predetermined conditions of low speed and angular position of the device to effect stopping of the device in the position selected.

12. An automatic washing machine, comprising a container having a door through which the material to be washed is inserted or removed, mechanism for actuating the machine for the washing operation, and connecting means between said mechanism and door whereby the closing movement of said door initiates operation of said mechanism, and also including automatic means controlled by said mechanism for opening said door at the conclusion of said operation.

13. An automatic washing machine, comprising a stationary outer casing having a door, a rotatable cylinder therein having a door, means for rotating said cylinder for the washing operation, and automatic means for stopping said cylinder with said two doors registering with each other and automatically opening one of said doors.

14. An automatic washing machine, comprising a stationary outer casing having a door, a rotatable cylinder therein having a door, means for rotating said cylinder for the washing operation, and automatic means for stopping said cylinder with said two doors registering with each other and automatically opening the casing door.

15. An automatic washing machine, comprising a receptacle for the material to be washed and provided with a door, means for actuating said machine, controlling means therefor arranged to cause the machine to perform a washing cycle, and means also controlled by said controlling means for automatically opening said door at the conclusion of said cycle.

16. An automatic washing machine, comprising a receptacle for the material to be washed and provided with a door, means for actuating said machine, controlling means therefor arranged to cause the machine to perform a washing cycle, means also controlled by said controlling means for automatically opening said door at the conclusion of said cycle, and means whereby closing movement of the door initiates operation of said controlling means.

17. A washing machine provided with a rotating cylinder having a plurality of circumferentially spaced door closed compartments, and means operatively connected with the cylinder, dependent upon its angular position and adapted for actuation during the washing operation of the machine, for causing the cylinder to stop with any one of said doors in a definite position.

18. A washing machine having a casing provided with a door, a rotating cylinder therein having circumferentially spaced doors, and manually controllable means actuated by the machine during the washing operation for automatically producing registration with the casing door of any one of said cylinder doors.

19. A washing machine, including a rotatable cylinder having a plurality of door closed compartments, operating mechanism therefor, controlling means for said mechanism adapted when operated to cause the cylinder to stop with a selected one of said doors in a definite angular position, and means controllable at will by the operator during the washing operation for preselecting said door.

In testimony whereof I hereby affix my signature.

EMIL J. CARROLL.